United States Patent [19]
Heid

[11] 3,732,954
[45] May 15, 1973

[54] QUICK CHANGE AUTOMATIC TRANSMISSION BAND AND BRACKET ASSEMBLY

[76] Inventor: Robert H. Heid, 24087 Dartmouth Avenue, Dearborn Heights, Mich. 48124

[22] Filed: Sept. 2, 1971

[21] Appl. No.: 177,273

[52] U.S. Cl. ................188/259, 192/80, 192/107 T
[51] Int. Cl. ...........................................F16d 65/06
[58] Field of Search ..................188/250 B, 250 F, 188/250 H, 259, 77; 192/80, 107 T

[56] References Cited

UNITED STATES PATENTS

| 699,962 | 5/1902 | Letts | 188/77 R |
| 1,371,917 | 3/1921 | McCulloch | 188/259 |
| 1,700,537 | 1/1929 | Key | 188/259 |
| 1,378,459 | 5/1921 | Hons, Jr. | 188/259 X |
| 2,637,420 | 5/1953 | Churchill | 192/80 X |

*Primary Examiner*—George E. A. Halvosa

[57] ABSTRACT

A brake band for an automatic transmission which is provided with a fixed retainer bracket on one end thereof and a detachable retainer bracket on the other end thereof to permit the brake band to be threaded around a brake band assembly in the transmission without removing the brake drum assembly from the transmission.

4 Claims, 5 Drawing Figures

PATENTED MAY 15 1973 3,732,954

INVENTOR.
Robert H. Heid
BY Robert D. Mentag
ATTORNEY

QUICK CHANGE AUTOMATIC TRANSMISSION BAND AND BRACKET ASSEMBLY

SUMMARY OF THE INVENTION

This invention relates to the automatic transmission art and more particularly to a novel and improved brake band for an automatic transmission.

In many cases wherein an automatic transmission is not operating properly, the trouble is due to a defective brake band and yet the brake drum assembly may still be in a usable condition. Heretofore, in order to replace a defective brake band, it was necessary to remove the entire brake drum assembly and do a major repair job on the transmission in order to insert a new brake band in the transmission. A major repair job is time consuming and costly.

In view of the foregoing, it is an object of the present invention to provide a quick change brake band for an automatic transmission which may be used to replace a defective brake band without the need for and expense of making a major repair job on the transmission. When using the brake band of the present invention, it is merely necessary to remove the old brake band by cutting the same in two and removing the two parts, and then threading a new brake band made in accordance with the present invention around the brake drum assembly and securing it in place. The prior art brake bands cannot be mounted around a brake drum assembly without removing the brake drum assembly because such bands are provided with fixedly mounted retainer brackets which prevent the threading of the prior art bands around a brake drum assembly when it is mounted in place in an automatic transmission. The only way a prior art brake band can be mounted on a drum assembly is to remove the entire drum assembly from the transmission, and this involves a major repair job. The automatic transmission brake band of the present invention is provided with a fixed retainer bracket on one end thereof, and a removable retainer bracket on the other end thereof. In order to thread the brake band of the present invention onto a brake drum assembly without removing the brake drum assembly from the transmission, it is merely necessary to remove the detachable retainer bracket and insert that end of the brake band first into the transmission and thread it around the brake band assembly.

It is another object of the present invention to provide a novel and improved automatic transmission brake band which is simple and compact in construction, economical to manufacture and efficient in operation.

It is still another object of the present invention to provide a brake band for an automatic transmission which includes a circular steel band provided with a brake lining on its inner surface and with two free ends, one of said band free ends having fixedly attached thereto, on the outer surface thereof, a first attachment plate carrying a fixed retainer bracket, the other of said band free ends having fixedly attached thereto, on the outer surface thereof, a second attachment plate, a detachable retainer bracket, and means for releasably securing said detachable retainer bracket to said second attachment plate.

Other objects, features and advantages of this invention will be apparent from the following detailed description, appended claims, and the accompanying drawing.

DESCRIPTION OF THE PREFERRED EMBODIMENTS

Figure 1:
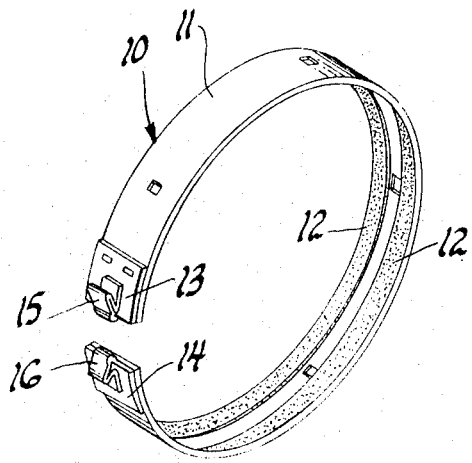
FIG. 1 is a perspective view of a prior art automatic transmission brake band, for example, the intermediate band of a C-4 or C-6 Ford automatic transmission.

Referring now to the drawing, and in particular to FIG. 1, the numeral 10 generally designates an illustrative prior art automatic transmission brake band which includes a metal circular band 11. The band 11 is provided with a pair of strips of laterally spaced apart brake linings 12 which are secured to the inner surface of the steel band 11 in the usual manner, as by being bonded thereto by a suitable adhesive. The band 11 has two adjacent, free ends, and fixed, as by welding, to these two free ends are a pair of brake attachment plates 13 and 14 which carry the brake band retainer brackets 15 and 16, respectively. The retainer brackets 15 and 16 are adapted to be releasably engaged by the struts or other means for securing the band in an operative position around a brake drum assembly. In order to replace an automatic transmission brake band 10 as illustrated in FIG. 1, it is necessary to remove the entire brake drum assembly and do a major repair job. The quick change bands of the present invention which are illustrated in FIGS. 2 through 5 are adapted to be mounted on a drum assembly without a major repair job, as more fully described hereinafter.

Figure 2:
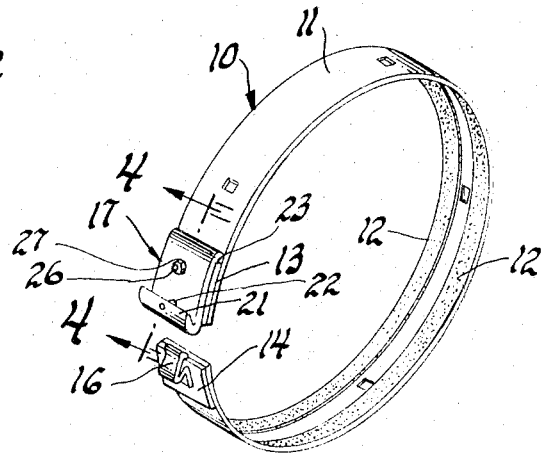
FIG. 2 is a perspective view of a first illustrative embodiment of an automatic transmission brake band made in accordance with the principles of the present invention.
Figure 3:
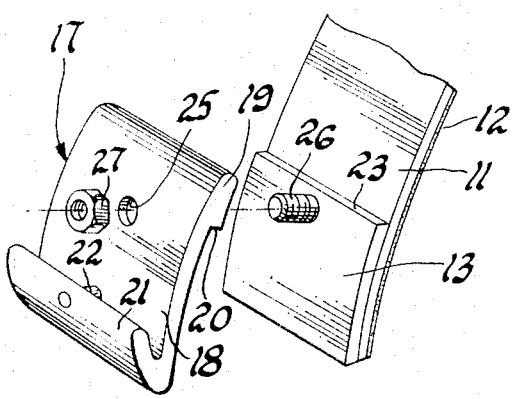
FIG. 3 is a fragmentary, exploded, perspective view of one end of the automatic transmission brake band illustrated in FIG. 2, and showing the manner of assembling a retainer bracket at one end of the band.
Figure 4:
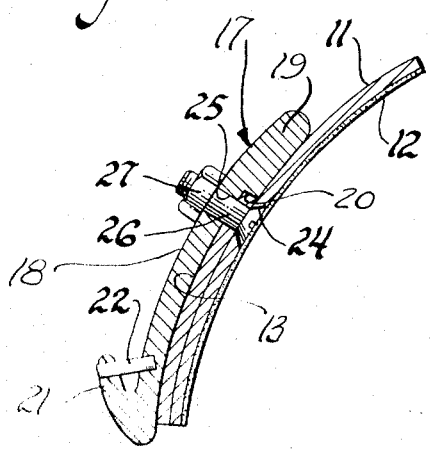
FIG. 4 is a fragmentary, enlarged, elevational section view of the band structure illustrated in FIG. 2, taken along the line 4—4 thereof, and looking in the direction of the arrows.

FIGS. 2, 3 and 4 illustrate a first brake band embodiment made in accordance with the principles of the present invention. The parts of the brake band illustrated in FIGS. 2, 3 and 4 which are similar to the parts of the prior art brake band illustrated in FIG. 1 have been marked with the same reference numerals. The difference between the prior art brake band of FIG. 1 and the brake band illustrated in FIGS. 2, 3, and 4 is that the fixed retainer bracket 15 of the band of FIG. 1 has been eliminated, and a detachably mounted retainer bracket 17 is employed in lieu thereof. As best seen in FIGS. 3 and 4, the retainer bracket 17 is provided with a body portion 18 which is plate-like in plan view and curved longitudinally so that its curved rear face is adapted to be seated on the curved front face of the attachment plate 13. The plate 13 is fixedly secured to one end of the metal band 11 by any suitable means, as by welding. The attachment plate 13 is as wide as the metal band 11.

The retainer bracket 17 is provided on the upper edge of the body portion 18 with an enlarged integral head portion 19, on the lower edge of which is formed a downwardly facing flat faced shoulder 20. Integrally mounted on the lower end of the retainer bracket body portion 18 is an outwardly and upwardly curved lip or hook member 21. A radially disposed pin 22 is mounted between the lip member 21 and the bracket body portion 18, with its ends fixedly mounted in suitable holes in said lip member and body portion by any suitable means, as by a press fit. The pin 22 functions to align its end of the band 10 with the strut or other member for securing the brake band end to an automatic transmission housing.

As shown in FIG. 3, the attachment plate 13 is provided on the upper end thereof with a flat faced shoulder 23 on which is adapted to be seated the shoulder 20 of the retainer bracket 17. As shown in FIG. 4, the surfaces of the shoulders 20 and 23 are disposed on a radius plane. The retainer bracket 17 is secured to the band 11 by a flat head machine screw 26 and a suitable self locking nut 27. The tapered head of the machine screw 26 is adapted to be seated in a tapered hole 24 formed through the metal band 11 in a position between the brake linings 12. The body of the screw 26 extends through a suitable bore 25 which is formed through the body member 18 of the retainer bracket 17.

Figure 5:
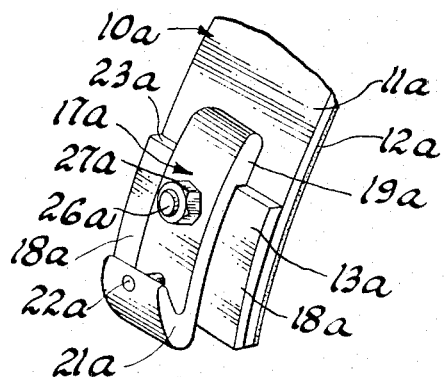
FIG. 5 is a fragmentary, elevational perspective view of a second illustrative embodiment of the invention, and showing the use of a smaller size retainer bracket.

The embodiment of FIGS. 2, 3 and 4 is adapted to be used in transmissions where the brake band must take a high load, as in a C-6 Ford automatic transmission. The embodiment of FIG. 5 illustrates an automatic transmission brake band provided with a retainer bracket 17a which is made in the same manner as the bracket 17 of FIGS. 2, 3 and 4, but it is narrower. The embodiment of FIG. 5 is adapted to be used in a transmission where a smaller amount of power is to be transmitted by the brake band, as for example, in a C-4 Ford automatic transmission.

The quick change automatic transmission band of the present invention is adapted to be used where it is necessary to replace a band in a transmission, as for example, an intermediate band, and wherein the transmission brake drum is in a condition where it is still usable and does not have to be replaced and will still function with, and be compatible with, a new band. Heretofore it was necessary to remove the entire brake drum assembly and perform a major transmission repair job in order to insert a new brake band in an automatic transmission. With the band of the present invention, it is merely necessary to remove the old band, as for example, the band of FIG. 1, and then thread the new band of the present invention around the brake drum. The old band may be removed by cutting the same into two pieces and removing the two parts. The new band made in accordance with the present invention is mounted around a brake drum in a transmission by first removing the retainer bracket 17 and the screw 26. The free end on which the detachable retainer bracket 17 is mounted is unobstructed, and this end is then threaded around the brake drum into an operative position, and the detachable bracket 17 is then mounted in place. It is not possible to mount the prior art brake band of FIG. 1, with the fixed brackets 15 and 16 on the ends thereof, in the same manner as is possible with the band of the present invention.

It should be understood that the band of the present invention can be used in transmissions to replace bands which are made of steel castings, without removing the brake drum assembly, where it is possible to cut the steel castings in parts to permit their removal.

It will be seen that the band of the present invention permits the replacement of an automatic transmission band at a minimum of cost and expenditure of time, as compared to making a complete transmission overhaul to replace a band with the prior art band of FIG. 1.

The retainer bracket 17 may be made from any suitable metal, as for example, an aluminum alloy. The bolt 26 functions only to hold the bracket 17 in place on the attachment plate 13, and it does not carry any load when the brake band is operating to brake a brake drum assembly. The load is carried by the pair of shoulders 20 and 23, and as stated before, these shoulders are preferably formed on a radius plane in a position perpendicular to a tangent line passing through said radius plane at the outer surface of the steel band 11. The shoulders 20 and 23 form a means for transferring the braking force from the retainer bracket 17 to the attachment plate 13 and thence to the band 11 without slippage.

While it will be apparent that the preferred embodiments of the invention herein disclosed are well calculated to fulfill the objects above stated, it will be appreciated that the invention is susceptible to modification, variation and change.

What I claim is:

1. A brake band for an automatic transmission comprising:
   a. a circular steel band provided with a brake lining on its inner surface and with two free ends;
   b. one of said band free ends having fixedly attached thereto at the outer end thereof and on the outer surface thereof, a first attachment plate having an inner end and carrying a fixed retainer bracket;
   c. the other of said band free ends having fixedly attached thereto at the outer end thereof and on the outer surface thereof, a second attachment plate having an outer curved face and an inner end;
   d. a detachable retainer bracket having an inner curved face and an inner end;
   e. means for releasably securing said detachable retainer bracket on the outer curved face of said second attachment plate;
   f. said second attachment plate being provided at the inner end thereof with a rearwardly facing load transmitting shoulder having a flat surface disposed perpendicular to the band outer surface; and,
   g. said detachable retainer bracket being provided adjacent the inner end thereof with a forwardly facing load transmitting shoulder having a flat surface disposed perpendicular to the band outer surface which is seated on the load transmitting shoulder on said second attachment plate.

2. A brake band for an automatic transmission as defined in claim 1, wherein said means for releasably securing said detachable retainer bracket to said second attachment plate comprises:
   a. a machine screw and lock nut means.

3. A brake band for an automatic transmission as defined in claim 1, wherein:
   a. said detachable retainer bracket is of a width equal to the width of the circular steel band.

4. A brake band for an automatic transmission as defined in claim 1, wherein:
   a. said detachable retainer bracket is of a width less than the width of the circular steel band.

* * * * *